United States Patent
Park et al.

(10) Patent No.: US 7,923,629 B2
(45) Date of Patent: Apr. 12, 2011

(54) METHOD FOR FABRICATING FLEXIBLE SEMICONDUCTOR ELECTRODE, SEMICONDUCTOR ELECTRODE FABRICATED THEREBY, AND SOLAR CELL USING THE SEMICONDUCTOR ELECTRODE

(75) Inventors: Young Jun Park, Suwon-si (KR); Jung Gyu Nam, Yongin-si (KR); Sang Cheol Park, Seoul (KR); Eun Sung Lee, Seoul (KR)

(73) Assignee: Samsung Electronics Co., Ltd. (KR)

( * ) Notice: Subject to any disclaimer, the term of this patent is extended or adjusted under 35 U.S.C. 154(b) by 899 days.

(21) Appl. No.: 11/516,392

(22) Filed: Sep. 6, 2006

(65) Prior Publication Data

US 2007/0125421 A1    Jun. 7, 2007

(30) Foreign Application Priority Data

Dec. 7, 2005    (KR) ................. 10-2005-0119099

(51) Int. Cl.
*H01L 31/00*    (2006.01)
*H01L 21/46*    (2006.01)
*H01L 29/10*    (2006.01)

(52) U.S. Cl. ............ 136/263; 438/458; 438/85; 438/99; 438/455; 438/104; 257/43

(58) Field of Classification Search .................. 136/243, 136/258, 260, 263, 264; 257/292, 293, 43; 438/57–98, 458, 104, 455, 99

See application file for complete search history.

(56) References Cited

U.S. PATENT DOCUMENTS

| 6,802,926 B2 * | 10/2004 | Mizutani et al. ............ 156/247 |
| 2003/0089899 A1 * | 5/2003 | Lieber et al. .................... 257/9 |
| 2006/0107997 A1 * | 5/2006 | Matsui et al. ................ 136/263 |

FOREIGN PATENT DOCUMENTS

| KR | 1020050000384 | 1/2005 |
| WO | WO9715959 A1 * | 1/1997 |

OTHER PUBLICATIONS

Han, WQ, "Nanocrystal Cleaving" Applied Physics Letters, Apr. 5, 2004, vol. 84(14), 2644-2645.*
Hur et al. "Extreme bendability of single walled carbon nanotube networks transferred from high temperarture growth substrates to plastic and their use in thin film transistors", Appl. Physics Letters 86 243502-1 243502-4, Jun. 2005.*
Moisala et al. "The role of metal nanoparticles in the catalytic production of single walled carbon nanotubes- a review", J. Phys. Condens Matter 15 (2003) S3011-S3035.*
Zhang "Growth of ZnO nanowires on modified well aligned carbon nanotube arrays", Nanotechnology 17 (2006) 1036-1040.*

* cited by examiner

*Primary Examiner* — Jeffrey T Barton
*Assistant Examiner* — Devina Pillay
(74) *Attorney, Agent, or Firm* — Cantor Colburn LLP (57) ABSTRACT

Disclosed herein is a method for fabricating a flexible semiconductor electrode including preparing a first substrate having a semiconductor layer disposed on a release layer, forming a second substrate having an adhesive layer disposed on a conductive material-coated flexible substrate, and pressing the first substrate against the second substrate under heat effective to transfer the semiconductor layer from the first substrate to the second substrate. The method allows for a flexible semiconductor electrode to be fabricated at low temperatures in a stable manner, and the flexible semiconductor electrode allows for high photoelectric conversion efficiency in a solar cell.

12 Claims, 5 Drawing Sheets

Semiconductor layer transfer

Semiconductor layer transfer

METHOD FOR FABRICATING FLEXIBLE SEMICONDUCTOR ELECTRODE, SEMICONDUCTOR ELECTRODE FABRICATED THEREBY, AND SOLAR CELL USING THE SEMICONDUCTOR ELECTRODE

CROSS-REFERENCE TO RELATED PATENT APPLICATIONS

This application claims priority to Korean Patent Application No. 2005-119099filed on Dec. 7, 2005and all the benefits accruing therefrom under 35 U.S.C. §119(a), the contents of which are herein incorporated by reference in its entirety.

BACKGROUND OF THE INVENTION

1. Field of the Invention

The present invention relates to a method for fabricating a flexible semiconductor electrode. More particularly, the present invention relates to a method of fabricating a flexible semiconductor electrode that includes transferring a semiconductor electrode from a first substrate to a flexible second substrate having an adhesive layer using both pressure and heat. Also, the present invention is directed to a flexible semiconductor electrode fabricated by the method, and a solar cell employing the flexible semiconductor electrode.

2. Description of the Related Art

A solar cell, which is a photovoltaic device for converting sunlight into electrical energy, uses energy that is unlimited and environmentally friendly, unlike many other energy sources, and has become increasingly more important over time.

Monocrystalline and polycrystalline silicon-based solar cells are more prevalent than other types of solar cells. However, silicon-based solar cells can suffer from high production costs and low photoelectric conversion efficiencies.

One alternative to silicon-based solar cells is an organic material-based solar cell that can be produced at low cost. In particular, significant attention is being paid to dye-sensitized solar cells because of their low production costs. Dye-sensitized solar cells, one kind of photoelectrochemical solar cell, utilize photo-sensitization of metal oxide semiconductors. The cells have a simple structure that generally includes a semiconductor electrode made from dye-absorbed, highly porous, metal oxide nanoparticles deposited on a transparent electrically conducting substrate, and a counter electrode, with an electrolyte interposed therebetween. The semiconductor electrode includes an electrically conductive transparent substrate, a metal oxide, and a light absorbing layer.

Functioning to extract energy from light, a dye-sensitized solar cell is a photoelectrochemical solar cell in which a photosensitive dye molecule is chemically adsorbed on a semiconductor material having a wide energy band gap. The photosensitive dye molecule functions to absorb visible light to produce electron-hole pairs. In addition to being environmentally friendly and being fabricated in a transparent form, dye-sensitized solar cells have advantages over silicon-based solar cells or chemical semiconductor-based solar cells in terms of production cost, and over other organic material-based solar cells in terms of photoelectric conversion efficiency.

A flexible dye-sensitized solar cell, employing a flexible semiconductor electrode, has attracted significant attention owing to its ability to be used as part of an auto-chargeable battery for mobile phones and next-generation personal computers (PCs), such as wearable PCs, and to its ability to be mounted on numerous items, such as clothes, caps, automobile glass, buildings, and the like.

Flexible semiconductor electrodes generally should be manufactured at 150° C. or less because flexible substrates are very likely to distort at higher temperatures.

Methods for manufacturing flexible semiconductor electrodes include printing a paste, which is baked at a low temperature, on a flexible substrate and drying it at less than 100° C., or forming a semiconductor layer on an opaque metal foil. However, the solar cells fabricated through such methods suffer from problems of low photoelectric conversion efficiency and poor film stability. Therefore, there is a need for a novel method for manufacturing a flexible semiconductor electrode at low temperatures in a stable manner.

According to one such method, a porous layer is first formed on the surface of a first substrate, followed by the formation of a semiconductor layer on the porous layer using liquid-phase epitaxy. A second substrate is attached to the semiconductor layer, and the first substrate is separated from the semiconductor layer using the porous layer, which results in the transfer of the semiconductor layer from the first substrate to the second substrate. In this method, the transfer of the semiconductor layer to the second substrate by the exertion of physical force on the porous layer requires strong adhesion between the semiconductor layer and the second substrate. Unfortunately, this causes some of the porous layer to remain on the semiconductor layer.

BRIEF SUMMARY OF THE INVENTION

The present invention overcomes the above described problems occurring in the prior art, and an aspect of the present invention includes providing a method for fabricating a flexible semiconductor electrode, which is simple and can be conducted at low temperatures in a stable manner.

Another aspect of the present invention includes providing a flexible semiconductor electrode fabricated using the method.

Still another aspect of the present invention includes providing a highly efficient solar cell employing the semiconductor electrode.

In accordance with an exemplary embodiment of the present invention, a method for fabricating a flexible semiconductor electrode includes preparing a first substrate having a semiconductor layer disposed on a release layer; forming a second substrate having an adhesive layer disposed on a conductive material-coated flexible substrate; and pressing the first substrate against the second substrate under heat effective to transfer the semiconductor layer from the first substrate to the second substrate.

Preparing the first substrate may include depositing a layer of a catalytic metal on the substrate; coating the layer of the catalytic metal with the semiconductor layer; heating the semiconductor layer; and forming the release layer at an interface between the substrate and the semiconductor layer.

In accordance with another exemplary embodiment of the present, invention, a flexible semiconductor electrode fabricated using the method, includes a flexible substrate, a layer of a conductive material, an adhesive layer, and a semiconductor layer.

In accordance with still another exemplary embodiment of the present invention, a dye-sensitized solar cell includes the flexible semiconductor electrode, a dye, a counter electrode, and an electrolyte.

BRIEF DESCRIPTION OF THE DRAWINGS

The above and other aspects, features, and other advantages of the present invention will be more clearly understood from the following detailed description taken in conjunction with the accompanying drawings, in which.

DETAILED DESCRIPTION OF THE INVENTION

The present invention will now be described more fully hereinafter with reference to the accompanying drawings, in which exemplary embodiments of the present invention are shown. This invention may, however, be embodied in many different forms and should not be construed as limited to the exemplary embodiments set forth herein. Rather, these exemplary embodiments are provided so that this disclosure will be thorough and complete, and will fully convey the scope of the invention to those skilled in the art. Like reference numerals refer to like elements throughout.

It will be understood that when an element is referred to as being "on" another element, it can be directly on the other element or intervening elements may be present therebetween. In contrast, when an element is referred to as being "directly on" another element, there are no intervening elements present. As used herein, the term "and/or" includes any and all combinations of one or more of the associated listed items.

It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of the present invention.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprise", "comprises", and "comprising," when used in this specification, specify the presence of stated features, integers, steps, operations, elements, components, and/or combination of the foregoing, but do not preclude the presence and/or addition of one or more other features, integers, steps, operations, elements, components, groups, and/or combination of the foregoing.

Spatially relative terms, such as "beneath", "below", "lower", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Figure 1:
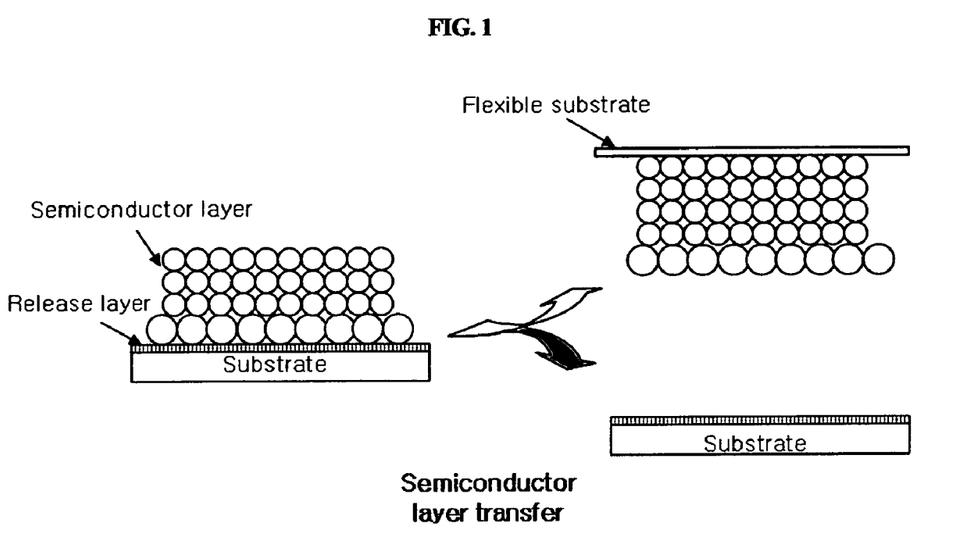
FIG. 1 is a schematic illustration of an exemplary embodiment of a process for fabricating a semiconductor electrode according to the present invention.

Referring now to FIG. 1, which schematically illustrates an exemplary embodiment of a method for manufacturing a flexible semiconductor electrode in accordance with the present invention. As seen in FIG. 1, a first substrate includes a semiconductor layer disposed on a release layer. A second substrate includes a conductive material-coated flexible substrate with an adhesive layer formed thereon. The semiconductor layer of the first substrate is transferred onto the second substrate by way of heat and pressure. The manufacturing method of the present invention will now be described in more detail below.

Figure 2:
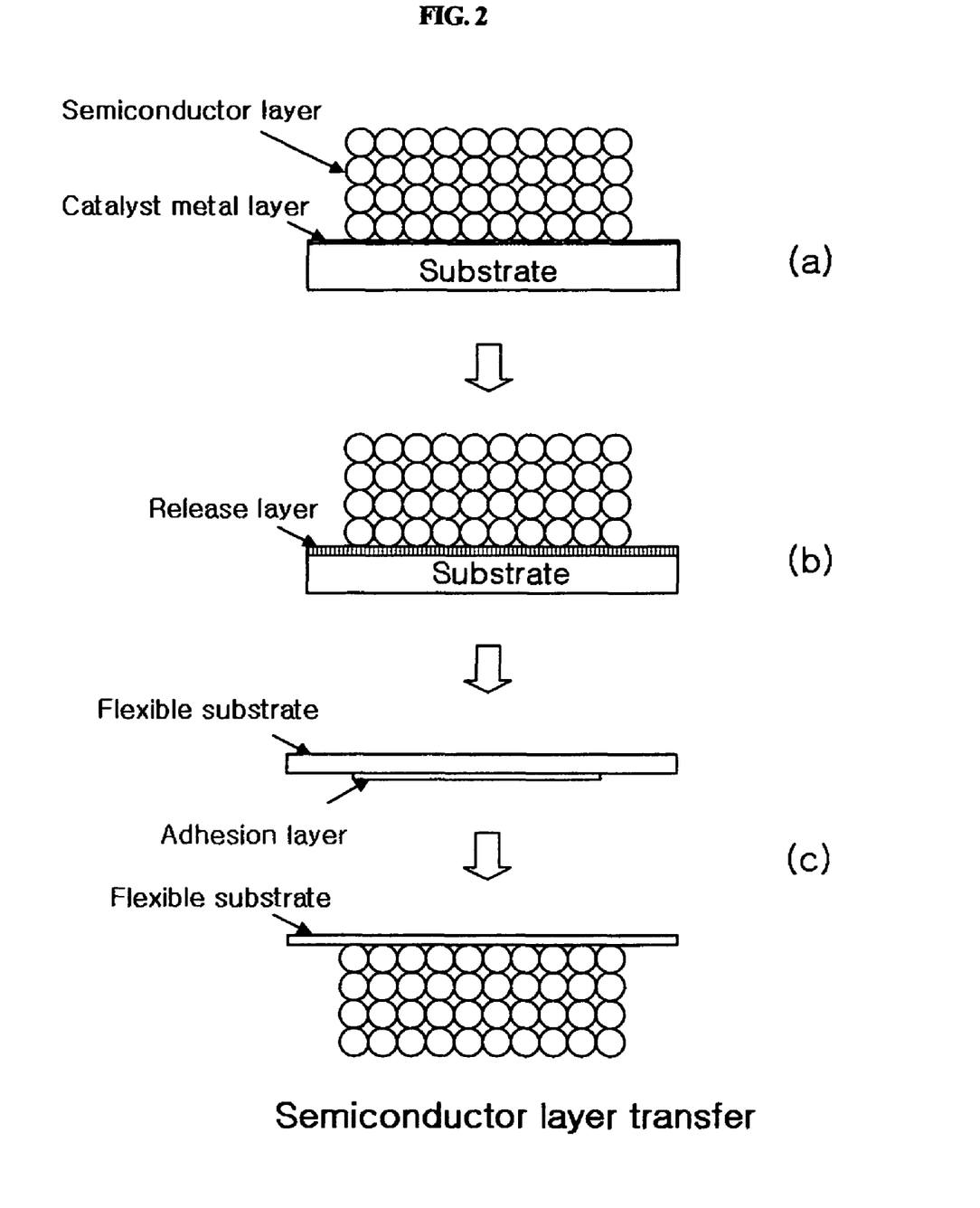
FIG. 2 is a schematic illustration of another exemplary embodiment of a process for fabricating a semiconductor electrode according to the present invention.

In an exemplary embodiment, as shown in FIG. 2, the manufacture of the flexible semiconductor electrode according to the present invention starts with the deposition of a catalytic metal on a first substrate. Subsequently, a metal oxide paste is printed on the layer of the catalytic metal, and baked.

Specific limitations are not imposed on materials for the first substrate as long as they can be treated at high temperatures. Examples of suitable materials include glass, metal, and silicon wafers.

The layer of the catalytic metal deposited on the first substrate allows for the provision of a release layer between the first substrate and the semiconductor layer. The layer of the catalytic metal is formed from a metal selected from the group consisting of nickel, iron, cobalt, palladium, platinum, and alloys thereof. In an exemplary embodiment, the layer of the catalytic metal has an average thickness of about 0.5 nanometers (nm) to about 10 nm.

Depositing the layer of the catalytic metal can be accomplished using any known coating method, including, for example, spraying, spin coating, dipping, printing, doctor blading, sputtering, or electron-beam physical vapor depositing.

After the layer of the catalytic metal is formed, a semiconductor layer is deposited on the layer of the catalytic metal. The semiconductor layer may comprise one or more selected from the group consisting of $TiO_2$, $ZnO$, $NB_2O_5$, $WO_3$, $ZnO_2$, and $MgO$. In an exemplary embodiment, the semiconductor layer comprises $TiO_2$.

When the metal oxide of the semiconductor layer is applied to a solar cell, its surface area is desirably enlarged not only to enable adsorption of a greater amount of the dye thereon, which enables greater sunlight absorption, but also to improve adsorption to the electrolyte layer. Accordingly, in an exemplary embodiment, the metal oxide of the. semiconductor layer has a nanostructure, and can comprise a nanotube, a nanowire, a nanobelt, a nanoparticle, or like nanostructured materials. As used herein, the term "nanostructured" refers to those materials having an average longest grain dimension of about 500 nm. Specifically, an average longest grain dimension of the metal oxide can be about 5 nm to about 100 nm, and more specifically about 2 nm to about 30 nm. In an exemplary embodiment, the semiconductor layer has a thickness of about 1 micrometer (μm) to about 30 μm.

It is also possible to mix two or more metal oxides having different grain dimensions so as to scatter incident light and improve quantum efficiency. For example, the semiconductor layer may be a monolayer or a bilayer structure made from two kinds of metal oxides that are different in size. In an exemplary embodiment, the semiconductor layer is a bilayer structure comprising a first layer having a thickness of about 5 μm to about 10 μm, made from metal oxide particles having an average longest grain dimension of about 100 nm to about 300 nm, is overlaid with a second layer having a thickness of about 10 μm to about 15 μm, made of metal oxide particles having an average longest grain dimension of about 2 nm to about 30 nm. After being transferred onto the flexible substrate, this semiconducting bilayer can serve as a light scattering layer on an electron generating layer.

The semiconductor layer is then heated or baked at about 450 degrees Celsius (° C.) to about 550° C. for about 0.5 hours to about 1 hour. This baking process converts the semiconductor layer into a crystalline structure in addition to sufficiently removing additives used during the deposition processes for both the layer of the catalytic metal and the semiconductor layer.

Subsequently, a release layer is provided at the interface between the first substrate and the semiconductor layer. Functioning to facilitate the separation of the semiconductor layer from the first substrate upon the transfer of the semiconductor layer onto the separate flexible second substrate, the release layer desirably has a porous nanowire structure.

As long as it has a porous nanowire structure, any composition may be used for the release layer in the present invention. For example, the release layer may comprise carbon nanotubes, ZnO nanowires, SiC, $SiO_2$, metal wires, and the like.

In an exemplary embodiment, the release layer comprises carbon nanotubes. Using a chemical vapor deposition (CVD) process or a plasma enhanced chemical vapor deposition (PECVD) process, the release layer is formed by directly growing the carbon nanotubes from the layer of the catalytic metal disposed at the interface between the first substrate and the semiconductor layer.

In one embodiment, for the growth of carbon nanotubes, a buffer layer may be formed on the first substrate using magnetron sputtering or electron-beam physical vapor deposition, before deposition of the layer of the catalytic metal. The buffer layer, which underlies the layer of the catalytic metal may have a thickness of about 0.5 nm to about 50 nm. The buffer layer may comprise one or more selected from the group consisting of aluminum (Al), titanium (Ti), chromium (Cr), and niobium (Nb).

In a furnace maintained at about 350° C. to about 900° C., the carbon nanotubes are grown in a direction at least substantially perpendicular to the surface of the layer of the catalytic metal, with the introduction of a carbonaceous gas, such as methane, acetylene, ethylene, ethane, carbon monoxide or carbon dioxide, together with $H_2$, $N_2$ or Ar gas, into the furnace.

The carbonaceous gas serves as a carbon source necessary for the growth of the carbon nanotubes. The carbonaceous gas decomposes on the surface of the catalytic metal, the carbon diffuses across the particle due to a carbon concentration gradient, and the carbon then precipitates out on the opposite side to vertically grow the carbon nanotubes. The reaction time can be adjusted from about 1 minute to about 30 minutes. By regulating the growth temperature and reaction time, the length of the carbon nanotubes can be controlled.

As described above, an adhesive layer is formed on a conductive material-coated flexible substrate to prepare the second substrate.

Examples of suitable materials for the flexible substrate include, but are not limited to, polyethylene terephthalate (PET), polyethylene naphathalate (PEN), polyimides, polymeric hydrocarbons, celluloses, plastics, polycarbonates, polystyrenes, and combinations thereof.

In an exemplary embodiment, the conductive material coated on the flexible substrate is tin-doped indium oxide (ITO), fluorine-doped tin oxide (FTO), ZnO—$Ga_2O_3$, ZnO—$Al_2O_3$ or $SnO_2$—$Sb_2O_3$. Other exemplary conductive materials include phenylpolyacetylene polymers, such as polydiphenyl acetylene, poly(t-butyl)diphenyl acetylene, poly(trifluoromethyl)diphenyl acetylene, poly(bistrifluoromethyl)acetylene, polybis(t-butyldiphenyl) acetylene, poly(trimethylsilyl)diphenyl acetylene, poly(carbazol)diphenyl acetylene, polydiacetylene, polyphenyl acetylene, polypyridine acetylene, polymethoxyphenyl acetylene, polymethylphenyl acetylene, poly(t-butyl)phenylacetylene, polynitrophenylacetylene, poly(trifluoromethyl)phenylacetylene, poly(trimethylsilyl)phenylacetylene, derivatives thereof, and polythiophene.

The adhesive layer formed on the flexible substrate can comprise a metal foil, such as Ag, Au, or the like; or a polymeric adhesive. Examples of the polymeric adhesive useful in the present invention include but are not limited to phenol resins, urea resins, melamine resins, [크리셀에 해당하는 표현을 확인해 주시기 바랍니다] PLEASE TRANSLATE resins, epoxy resins, isocyanate-, acetic acid vinyl-, polyester-, polyvinylalcohol-, acrylate-, cyanoacrylate-, and synthetic rubber-based adhesives.

Formation of the adhesive layer may comprise any known coating method, including for example, spraying, spin coating, dipping, printing, doctor blading, sputtering, or an electrophoresis process.

The first substrate is pressed, while being heated, against the second substrate comprising the flexible substrate coated with the adhesive layer to transfer the semiconductor layer from the first substrate to the second substrate. In an exemplary embodiment, the transferring process occurs at a pressure of about 0.1 megaPascals (MPa) to about 1 MPa. In an exemplary embodiment, the transferring process occurs at a temperature of about 100° C. to about 300° C. In an exemplary embodiment, the transferring process occurs for a duration of about 10 to about 180 seconds.

The semiconductor electrode fabricated according to the method of the present invention has a multilayer structure, in which a conductive layer, an adhesive layer, and a semiconductor layer are formed on a flexible substrate. Each layer of the structure is formed as described hereinabove.

The semiconductor electrode according to the present invention may be employed in photoelectrochromic devices and solar cell-operable display devices as well as in various solar cells. Having a high photoelectric conversion capacity, the semiconductor electrode of the present invention can be used to implement highly efficient photoelectric conversion devices.

In accordance with another exemplary embodiment, the present invention is directed to a solar cell comprising the flexible semiconductor electrode, a dye, a counter electrode and an electrolyte.

Figure 3:
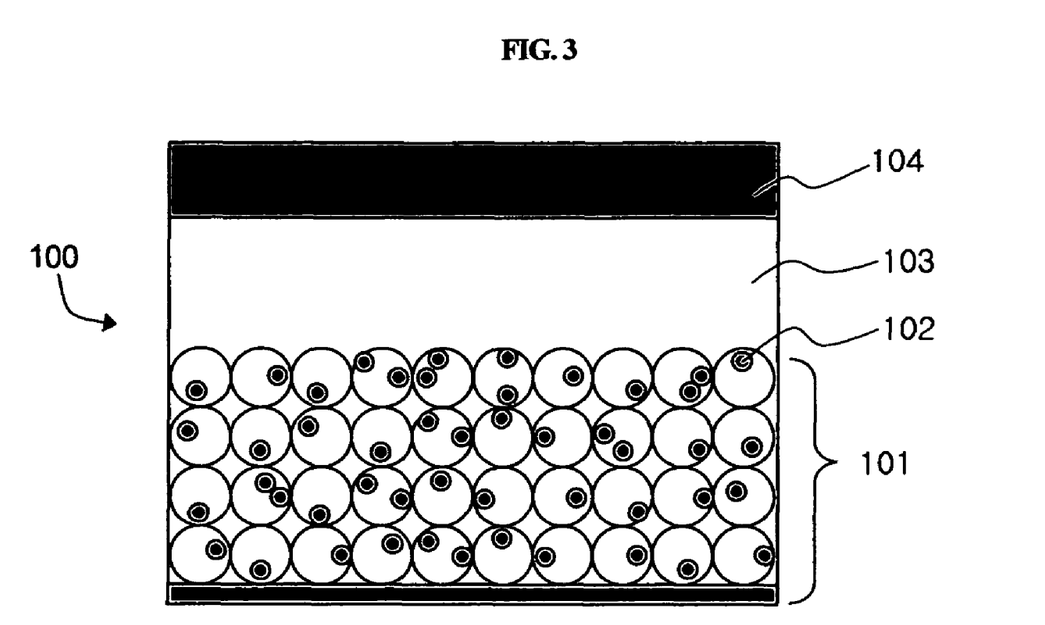
FIG. 3 is a schematic illustration of a cross section of an exemplary embodiment of a solar cell according to the present invention.

Referring now to FIG. 3, an exemplary embodiment of a solar cell according to the present invention is shown schematically. The solar cell, generally designated 100, includes a flexible semiconductor electrode 101 coated with a dye 102, and a counter electrode 104, with an electrolyte layer 103 interposed therebetween. As described above, the flexible semiconductor electrode 101 is fabricated by transferring the semiconductor layer to the flexible substrate by way of the release layer. The following description will make reference to the other components (i.e., dye 102 electrolyte layer 103 and counter electrode 104).

As long as it has the function of electric charge separation and photosensitization, any dye 102 may be used in the present invention without limitation. Exemplary dyes 102 include ruthenium complexes such as $RuL_2(SCN)_2$, $RuL_2(H_2O)_2$, $RuL_3$, and $RuL_2$, wherein L is 2,2'-bipyridyl-4,4'-dicarboxylate. In addition to ruthenium complexes, other exemplary dyes 102 include xanthine-based dyes such as rhodamine B, rose bengal, eosin, and erythrosine; cyanine-based dyes such as quinocyanine and cryptocyanine; basic dyes such as phenosafranine, carby blue, thiosine, and methylene blue; porphyrin-based compounds such as chlorophyll, zinc porphyrin, and magnesium porphyrin; azo dyes; phthalocyanine compounds; complex compounds such as ruthenium trisbipyridyl; anthraquinone-based dyes; polycyclic quinone-based dyes, or the like, or a combination comprising at least one of the foregoing dyes.

Any electrolyte may be used, without limitation, for the electrolyte 103 in the solar cell 100 of the present invention as long as it has a function of conducting holes. Exemplary electrolytes 103 include solutions of iodide in, for example, acetonitrile, N-methyl-2-pyrrolidone (NMP), or 3-methoxypropionate.

Any electrically conductive material may be used to produce the counter electrode 104 Even an insulating material may be used, as long as the side thereof facing the flexible semiconductor electrode 101 is covered with a layer of a conductive material. In an exemplary embodiment, an electrochemically stable material, such as platinum, gold, or carbon, is used as the counter electrode 104.

The fabrication of the solar cell 100 according to the present invention is not specifically limited, but may employ any known method without restriction. The solar cell 100 may be fabricated, for example, by arranging the flexible semiconductor electrode 101 of the present invention and the counter electrode 104 such that they face with each other, forming a closed space between the two electrodes, and injecting the electrolyte 103 into the closed space.

Hereinafter, the present invention will be described in detail with reference to examples. It is to be understood, however, that these examples are for illustrative purposes only and are not to be construed to limit the scope of the present invention.

EXAMPLE 1

Production of Flexible Semiconductor Electrode

Figure 4:
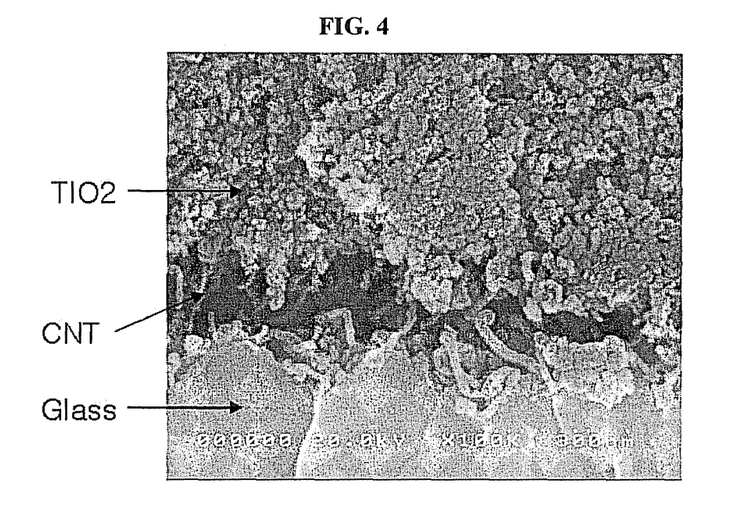
FIG. 4 is a scanning electron microscope (SEM) image showing the contact interface between a glass substrate and a $TiO_2$ layer, as formed in Example 1

An aluminum buffer layer was deposited to a thickness of 10 nm on a glass substrate using e-beam physical vapor deposition, followed by the formation of a 2 nm layer of a catalytic metal from invar (Ni:Fe:Co=42:52:6 weight % (wt %)) over the buffer layer. Subsequently, a 5 μm thick layer of 300 nm $TiO_2$ particles, or a 15 μm thick layer of 9 nm $TiO_2$ particles, was deposited using a printing process, followed by baking at 500° C. for 1 hour in air. In a furnace maintained at 500° C., the resulting substrate was thermally treated, with the introduction of acetylene and argon into the furnace, to form a carbon nanotube release layer on the layer of the catalytic metal. The first substrate thus obtained was analyzed using a scanning electron microscope (SEM), and the result is shown in FIG. 4. As seen in FIG. 4, a carbon nanotube (CNT) layer was formed at the interface between the glass substrate and the $TiO_2$ layer.

Separately, an Ag adhesive layer was formed to a thickness of 100 nm on an ITO-coated polyethylene naphthalate (PEN) flexible substrate. The first substrate was overlaid on the second substrate in such a way that the semiconductor layer of the first substrate faced the adhesive layer of the second substrate. At 150° C., the first substrate was pressed at a force of 0.6 MPa against the second substrate for 120 seconds to transfer the $TiO_2$ layer onto the adhesive layer of the second substrate to produce a flexible semiconductor electrode.

Figure 5:
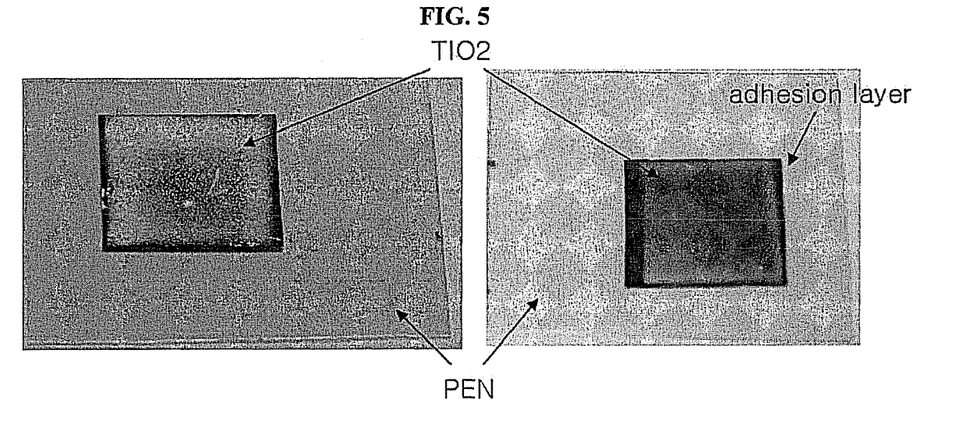
FIG. 5 includes a pair of photographs showing the exemplary flexible semiconductor electrode fabricated in Example 1.

Referring now to FIG. 5, photograph images of the flexible semiconductor electrodes obtained in Example 1 are shown. The left panel illustrates a semiconductor layer comprising 300 nm $TiO_2$ particles, and the right panel illustrates a semiconductor layer comprising 9 nm $TiO_2$ particles.

EXAMPLE 2

Fabrication of Solar Cell

The flexible semiconductor electrode obtained in Example 1 was immersed into a 0.3 millimoles per liter (mM) dithiocyanate 2,2-bipyridyl-4,4-dicarboxylate solution for 24 hours and dried to adsorb the dye onto the $TiO_2$ particles. A counter electrode sputtered with platinum was assembled with the flexible semiconductor electrode, and an electrolyte was charged in the space between the two facing electrodes to produce a solar cell. The electrolyte was an $I_3^-/I^-$ solution containing 0.6 moles per liter (M) 1,2-dimethyl-3-octyl imidazolium iodide, 0.2 M LiI, 0.04 M $I_2$, and 0.2 M 4-tert-butyl pyridine (TBP) in acetonitrile.

The solar cell was evaluated for photoelectric conversion efficiency by measuring the photovoltage and photocurrent thereof. A xenon lamp (Oriel, 01193) was used as a light source. The spectral irradiance for the AM 1.5 standard was corrected with a reference solar cell (Furnhofer Institute Solare Engeriessyteme, Certificate No. C-ISE369, Type of material: Mono-Si$^+$KG filter). After being calculated from photocurrent-voltage curves, current densities ($I_{sc}$), open circuit voltages ($V_{oc}$) and fill factors (FF) were used to obtain photoelectric conversion efficiencies ($\eta_e$) of the solar cells through Mathematical Formula 1 (shown below). The results are summarized in Table 1 below.

$$\eta_e = (V_{oc} \cdot I_{sc} \cdot FF)/(P_{inc}) \quad \text{[Mathematical Formula 1]}$$

wherein $P_{inc}$ is expressed in units of 100 mw/cm$^2$ (1 sun).

TABLE 1

| Solar Cell | $I_{sc}$ (mA) | $V_{oc}$ (mV) | FF | $\eta_e$ (%) |
| --- | --- | --- | --- | --- |
| Example 2 | 0.539 | 530.071 | 0.547 | 0.156 |

Figure 6:
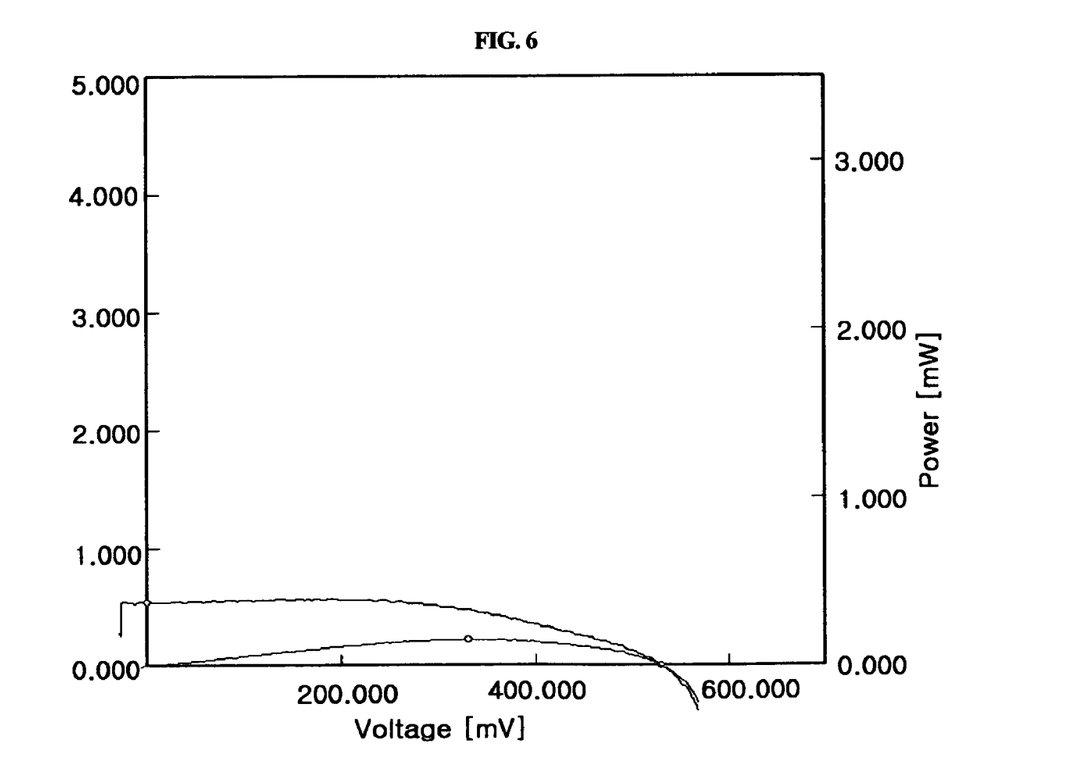
FIG. 6 is a graph showing the current as a function of voltage for the exemplary solar cell formed in Example 2

The current-voltage curve of the solar cell fabricated in Example 2 is depicted in FIG. 6. Taken together, the data of Table 1 and the current-voltage curve of FIG. 6 demonstrate that the solar cell of the present invention has excellent photoelectric conversion efficiency.

As described hereinbefore, the method of the present invention allows for a flexible semiconductor electrode to be fabricated at low temperatures in a stable manner, and the flexible semiconductor electrode allows for a high photoelectric conversion efficiency in solar cells.

Although the present invention has been described with reference to the foregoing exemplary embodiments, these exemplary embodiments do not serve to limit the scope of the present invention. Accordingly, those skilled in the art to which the present invention pertains will appreciate that various modifications, additions and substitutions are possible, without departing from the scope and spirit of the accompanying claims.

What is claimed is:

1. A method for fabricating a flexible semiconductor electrode, the method comprising:
    preparing a first substrate comprising a semiconductor layer disposed on a release layer;
    forming a second substrate comprising an adhesive layer disposed on a conductive material-coated flexible substrate; and
    pressing the first substrate against the second substrate under heat effective to transfer the semiconductor layer from the first substrate to the second substrate to form the flexible semiconductor electrode;
    wherein preparing the first substrate comprises:
        depositing a catalytic metal layer on a substrate;
        coating the catalytic metal layer with the semiconductor layer;
        heating the semiconductor layer; and
        forming the release layer at an interface between the catalytic metal layer and the semiconductor layer, and
        wherein the semiconductor layer comprises a metal oxide selected from the group consisting of $TiO_2$, ZnO, $Nb_2O_5$, $WO_3$, $SnO_2$ and MgO.

2. The method as set forth in claim 1, wherein the first substrate comprises a material selected from the group consisting of glass, metal, and silicon.

3. The method as set forth in claim 1, wherein the catalytic metal layer comprises a metal selected from the group consisting of nickel, iron, cobalt, palladium, platinum, and alloys thereof.

4. The method as set forth in claim 1, wherein a thickness of the semiconductor layer is about 1 micrometer to about 30 micrometers.

5. The method as set forth in claim 1, wherein the semiconductor layer comprises particles having an average longest grain dimension of about 1 nanometer to about 200 nanometers.

6. The method as set forth in claim 1, wherein the release layer comprises a material selected from the group consisting of carbon nanotubes, ZnO nanowires, SiC nanowires, metal nanowires, and Si nanowires.

7. The method as set forth in claim 6, wherein the carbon nanotubes are formed using chemical vapor deposition.

8. The method as set forth in claim 1, wherein the second substrate comprises a polymer selected from the group consisting of polyethylene terephthalate, polyethylene naphathalate, polyimides, polymeric hydrocarbons, celluloses, plastics, polycarbonates, polystyrenes, and combinations thereof.

9. The method as set forth in claim 1, wherein the adhesive layer comprises a gold metal foil, a silver metal foil, or a polymeric adhesive.

10. The method as set forth in claim 1, wherein the pressing the first substrate against the second substrate under heat is conducted at a pressure of about 0.1 megaPascals to about 1 megaPacal.

11. The method as set forth in claim 1, wherein the pressing the first substrate against the second substrate under heat is conducted at a temperature of about 100 degrees Celsius to about 300 degrees Celsius.

12. The method as set forth in claim 1, wherein the pressing the first substrate against the second substrate under heat is conducted for about 10 seconds to about 180 seconds.

* * * * *